UNITED STATES PATENT OFFICE.

GADIENT ENGI, OF BASEL, SWITZERLAND, ASSIGNOR TO SOCIETY OF CHEMICAL INDUSTRY IN BASLE, OF BASEL, SWITZERLAND.

COLORED CONDENSATION PRODUCTS AND PROCESS OF MAKING SAME.

1,043,682.  Specification of Letters Patent.  Patented Nov. 5, 1912.

No Drawing.  Application filed May 21, 1912. Serial No. 698,776.

*To all whom it may concern:*

Be it known that I, GADIENT ENGI, doctor of philosophy and chemist, citizen of the Swiss Republic, and resident of Basel, Switzerland, have invented new Colored Condensation Products and Processes of Making Same, of which the following is a full, clear, and exact specification.

I have found that new, intense red, blue red and violet colored condensation products are obtained by the action of halids of arylated fatty acids of the formula

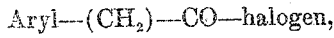

Aryl—($CH_2$)—CO—halogen, as for instance the chlorid of phenylacetic acid, on an indigo substance, as for instance indigo and its derivatives.

The invention is illustrated by the following examples, the parts being by weight:

Example I: 20 parts of indigo and 80 parts of chlorid of phenylacetic acid are boiled together on an oil bath in a vessel provided with a reflux condenser, whereby the reaction mass becomes shortly intense blue red, while a violent evolution of hydrochloric acid takes place. After heating for half an hour, the mass is allowed to cool, diluted with 250—300 parts of nitrobenzene or of xylene, again heated for a short time to boiling and separated by filtration from the eventually not dissolved parts. By cooling down the filtered liquid, the new condensation product separates in form of bright red small crystals which are filtered, washed with alcohol and dried. The condensation product thus obtained is completely insoluble in water, dilute alkalis and dilute acids. In organic solvents, as xylene, toluene, nitrobenzene it is difficultly soluble when cold, but easily soluble when hot with a carmine red coloration and an intense yellow fluorescence. Concentrated sulfuric acid dissolves it to a yellow orange solution of yellowish fluorescence. By diluting its solution in sulfuric acid with ice-water the unaltered condensation product separates in form of carmine red flakes. In fuming sulfuric acid of 24 per cent. anhydrid the product dissolves with an intense orange color, and on heating the so obtained solution sulfonation incurs, as no further precipitation takes place when the solution is poured into water and as from the thus obtained dilute solution the formed sulfuric acid can be salted out by an addition of common salt. This sulfonic acid dyes wool and silk in an acid bath carmine red tints. By heating the condensation product at a high temperature it is sublimated and gives carmine red vapors.

An elementary analysis shows that the formation of the new condensation product occurs by the reaction of 2 molecules of chlorid of phenylacetic acid on 1 molecule of indigo, while hydrochloric acid and water are split off, probably according to the following formulæ:

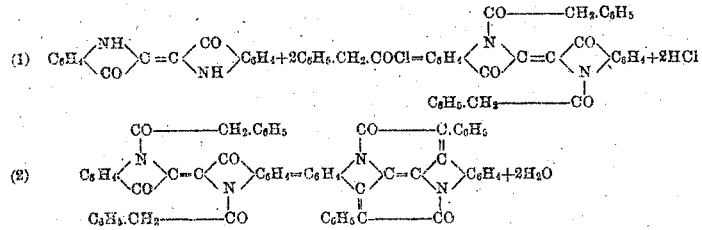

| | Calculated for $C_{32}H_{18}N_2O_2$— | Found— |
|---|---|---|
| | C=83.11% | 82.79% |
| | H= 3.90% | 4.29% |
| | N= 6.06% | 5.95% |
| | O= 6.93% | ------ |

Example II: 5 parts of indigo are heated to boiling together with 25 parts of nitrobenzene and 12 parts of chlorid of phenylacetic acid, on an oil bath, for 1 to 1½ hours, in a vessel provided with a reflux condenser. On cooling the condensation product separates in form of small red crystals.

Example III: 20 parts of 7.7'-dimethylindigo are heated together with 70 to 80 parts of chlorid of phenylacetic acid on an oil bath, for 20 to 30 minutes to 180° C. (temperature of the oil bath) in a vessel provided with a reflux condenser, whereby an evolution of hydrochloric acid takes place and the reaction mass assumes a red coloration. The mass is then cooled down and about 170 parts of nitrobenzene are added thereto and the mixture again shortly heated to boiling, filtered and cooled down. The separated, vivid red colored crystals are filtered, washed successively with nitrobenzene and alcohol and dried. The product thus obtained dissolves in hot xylene or hot nitrobenzene to a carmine red solution of yellow fluorescence.

Example IV: 3 parts of 5.5'-dibromindigo are heated to boiling with 12 parts of chlorid of phenyl-acetic acid, whereby the mass of reaction becomes deep red. After the heating has been continued for about ½ hour, the mass is diluted with 30 parts of nitrobenzene and worked up as in the foregoing examples. The brominated condensation product thus obtained constitutes blue red crystals analogous to the condensation product derived from indigo. Its carmine red solution in organic solvents shows also the intense yellow fluorescence, which is characteristic for the bodies of this group.

Example V: 3 parts of tetrabromindigo are boiled for some time with 10 to 12 parts of chlorid of phenylacetic acid and the reaction mass worked up in the above specified manner, whereby the condensation product is at first obtained in the form of a gray crystalline powder assuming by grinding a blue red color. By pouring its orange yellow sulfuric solution into ice-water, the unaltered condensation product separates as intensive blue red colored flakes. In organic solvents, as for instance xylene, it dissolves to a carmine red solution of yellow fluorescence. In a similar manner is effected the preparation of condensation products when other substitution products of indigo, as for instance hexabromindigo, 7.7'-dimethoxyindigo, 5.5'-dimethoxyindigo, tetramethylindigo, hexamethylindigo, dichlorindigo, 5.7:5'.7'-tetrachlorindigo, 4.5:4'.5'-tetrachlorindigo, monobromindigo, monochlorindigo, are employed or when the chlorid of phenylacetic acid is replaced by its homologues, analogous or substitution products.

The products obtained according to the described process and their sulfonic acids are to be employed in the industry of dyestuffs.

What I claim is:

1. The described process for the manufacture of new colored condensation products consisting in treating an indigo substance with a halid of an arylated fatty acid, substantially as described.

2. The described process for the manufacture of new colored condensation products consisting in treating an indigo substance with a halid of phenylacetic acid, substantially as described.

3. As new products the condensation products derived from an indigo substance and a halid of an arylated fatty acid, forming in dry state red to violet powders, insoluble in water, difficultly soluble in cold xylene and nitrobenzene, but easily soluble in these solvents when hot with a carmine color, the solutions showing an intense yellow fluorescence, and dissolving in concentrated sulfuric acid with yellowish orange to orange color, from which solutions on addition of ice-water the unaltered condensation product is precipitated in the form of bright red to violet flakes.

4. As new products the condensation products derived from an indigo substance and a halid of phenyl-acetic acid, forming in dry state red to violet powders, insoluble in water, difficultly soluble in cold, but easily soluble in hot xylene and nitrobenzene with carmine color and intensive yellow fluorescence and dissolving in concentrated sulfuric acid with yellowish orange to orange color, from which solutions on addition of ice-water the unaltered condensation product is precipitated in the form of bright red to violet flakes.

In witness whereof I have hereunto signed my name this 9th day of May 1912, in the presence of two subscribing witnesses.

GADIENT ENGI.

Witnesses:
AMAND RITTER,
GEO. GIFFORD.